United States Patent [19]

Ogasawara et al.

[11] Patent Number: 5,418,643
[45] Date of Patent: May 23, 1995

[54] MIRROR ASSEMBLY FOR USE IN AUTOMOBILE HAVING WATER DROPS REMOVING APPARATUS

[75] Inventors: Morihiko Ogasawara; Koichi Ohno, both of Aichi, Japan

[73] Assignee: Kabushiki Kaisha Tokai Rika Denki Seisakusho, Aichi, Japan

[21] Appl. No.: 957,379

[22] Filed: Oct. 7, 1992

[30] Foreign Application Priority Data

Oct. 7, 1991 [JP] Japan ............................ 3-081264 U

[51] Int. Cl.⁶ ........................... B60R 1/06; G02B 5/08; G02B 7/18
[52] U.S. Cl. .................... 359/507; 15/250.003
[58] Field of Search .............. 359/507, 508, 509, 512, 359/514, 871, 872; 15/250 B, 250.003; 310/321, 322

[56] References Cited

U.S. PATENT DOCUMENTS

| | | | |
|---|---|---|---|
| 3,059,540 | 10/1962 | Robinson | 359/509 |
| 4,726,656 | 2/1988 | Schofield et al. | 359/665 |
| 4,929,072 | 5/1990 | Fujie et al. | 359/507 |
| 5,037,189 | 8/1991 | Fujie et al. | 359/507 |
| 5,044,740 | 9/1991 | Ogasawara | 359/871 |
| 5,115,353 | 5/1992 | Mori et al. | 359/514 |
| 5,151,824 | 9/1992 | O'Farrell | 359/514 |
| 5,155,625 | 10/1992 | Komatsu et al. | 359/512 |
| 5,170,288 | 12/1992 | Imaizumi et al. | 359/507 |
| 5,233,467 | 8/1993 | Ogasawara | 359/507 |

FOREIGN PATENT DOCUMENTS

| | | | |
|---|---|---|---|
| 2048191 | 12/1980 | United Kingdom | 359/509 |
| 2054329 | 2/1981 | United Kingdom | 359/507 |

*Primary Examiner*—Ricky D. Shafer

[57] ABSTRACT

A mirror assembly for use in an automobile having a water drops removing apparatus. A mirror glass is held by a back holder which includes a flange engaging a front surface of an edge of the mirror glass. The flange has a plurality of projections extending from the flange to contact the glass surface. The projections maintain a predetermined gap between the inner surface of the flange and the glass surface so that the pumping action and cavitation of the water drops in the gap are prevented.

11 Claims, 3 Drawing Sheets

MIRROR ASSEMBLY FOR USE IN AUTOMOBILE HAVING WATER DROPS REMOVING APPARATUS

BACKGROUND OF THE INVENTION

1. Field of the Invention

The present invention relates to an outside mirror assembly for use in an automobile which includes an ultrasonic wave generator for removing water drops on the surface of the mirror glass. More particularly, the present invention relates to a mirror glass holding apparatus for holding the mirror grass to which the vibration is applied by the ultrasonic wave generator.

2. Description of the Prior Art

As is well known, when the water drops of rain or fog adhere on the surface of the mirror glass incorporated in the outside mirror assembly for use in the automobile, the mirror glass becomes blurred, naturally. Accordingly, there has been conventionally provided the above described type mirror assembly having an ultrasonic wave generator for removing the water drops on the mirror glass. The mirror glass is vibrated by means of the ultrasonic wave generator mounted behind the mirror glass so that the water drops are splashed out of the surface of the mirror glass.

FIG. 1 is a front view of the conventional mirror assembly of a type as described above, and FIG. 2 is a section taken along a line II—II in FIG. 1. As shown in the figures, a mirror glass 10 is held by a back support or back holder 16. The back holder 16 has a peripheral flange 14 which engages the front surface of the edge of the mirror glass 10. There is provided a supersonic wave generator in the back holder 16 and behind the mirror glass 10. The supersonic wave generator comprises a vibration element 18 and a vibration plate 20 which is driven by the vibration element 18 to cause the vibration of the mirror glass 10. When the vibration of the vibration element 18 is transmitted to the mirror glass 10 via the vibration plate 20, the mirror glass 10 vibrates to splash the water drops on the surface thereof.

Meanwhile, according to the conventional apparatus the water drops D2 caught in a gap between the flange 14 and the edge of the mirror glass as well as the water drops D1 on the center side of the mirror glass 10 are splashed, as shown in FIG. 2, so that the splashed water drops D2 disadvantageously adhere again onto the surface of the center side of the mirror glass 10.

In the conventional apparatus, the gap between the flange 14 and mirror glass 10 is generally set at a very small value, for example below 0.1 mm in order that the mirror glass 10 can be surely secured by the flange 14 or the back holder 16.

The inventors of the present invention have conducted an investigation into the cause of the phenomena of splashing water drops from the edge of the mirror glass 10 and had the following result. Namely, the inventors have found a fact such that the gap volume defined by the flange 14 and the mirror glass 10 is altered continuously due to the vibration of the mirror glass 10, resulting in a production of a pumping action for splashing the water drops D2.

In order to solve the conventional disadvantage, the gap between the flange 14 and the mirror glass 10 might be reduced to prevent the pumping action. In this case, however, the mount of the mirror glass 10 is loosened disadvantageously and a cavitation might be generated in the water drops D2 so as to splash the water drops D2.

SUMMARY OF THE INVENTION

The present invention has been developed with a view to substantially solving the above described disadvantages and has for its essential object to provide an improved mirror assembly for use in an automobile having a supersonic wave generator for splashing the water drops adhering on the mirror surface, in which the mirror glass can be surely secured by the flange of the back holder and the remaining water drops between the flange and the mirror glass can be prevented from splashing out of the gap due to the vibration of the glass mirror.

In order to achieve the aforementioned objective, there is provided a mirror assembly for use in an automobile including a improved water drop removing apparatus.

The mirror assembly includes a mirror glass, a back holder for holding the mirror glass, having a flange which engages the front surface of the edge of the mirror glass, and a supersonic generator for causing a vibration of the mirror glass which is mounted in the back holder and behind the mirror glass.

The flange includes a plurality of projections which are spaced from each other and extend from the inner surface of the flange to contact the front surface of the edge of the mirror glass so that a gap is defined between an inner surface of the flange and the front surface of the edge of the mirror glass and is set at a predetermined value such that a pumping action and cavitation of the water drops caught in the gap, which might be produced due to a vibration of the mirror glass, can be prevented.

The gap is preferably 0.2–0.8 mm.

With the arrangement as described above, the splash of the water drops retained in the gap can be prevented since the pumping action and cavitation is controlled. On the contrary, the mirror glass can be securely held by the back holder with the projections depressing the front surface of the edge of the mirror glass.

Each of the projection is preferably spaced from a side inner face of the back holder so as to define a space or a passage surrounded by the projection, the flange, the side inner face of the back holder and the front surface of the edge of the mirror glass. Then, the water drops caught in the gap at sides can pass downwardly through the space along the glass surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This and other objects and features of the present invention will become clear from the following description taken in conjunction with the preferred embodiments thereof with reference to the accompanying drawings throughout which like parts are designated by like reference numerals, and which are given by was of illustration only, and thus are not limitative of the present invention, and in which.

DETAILED DESCRIPTION OF THE PREFERRED EMBODIMENTS

Figure 1:
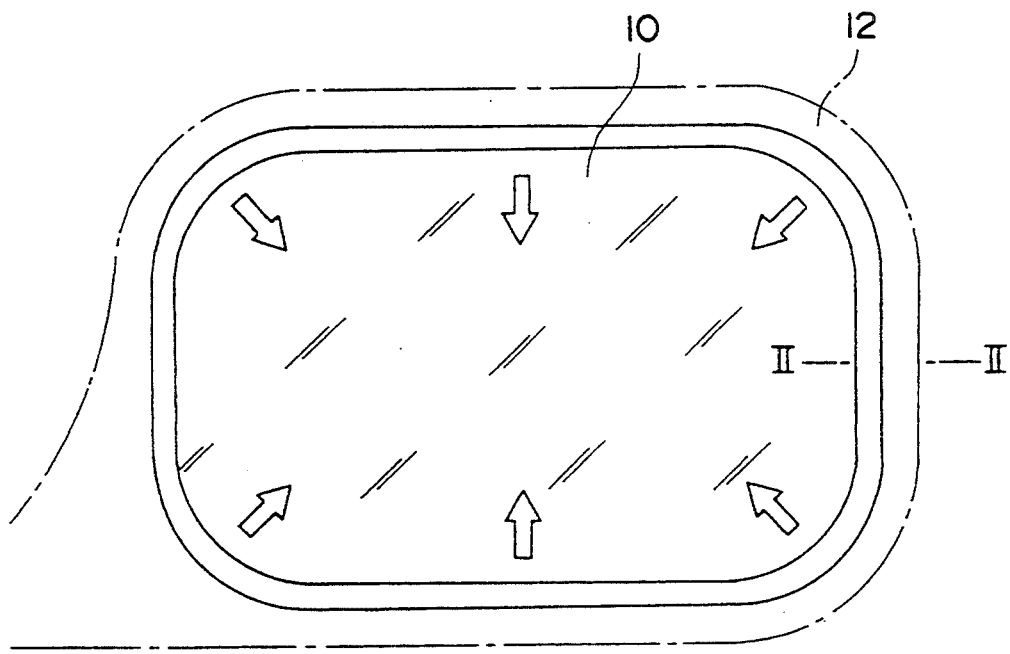
FIG. 1 is a front view of a conventional mirror assembly for use in an automobile having a supersonic wave generator for removing the water drops on the mirror surface, as previously described.
Figure 2:
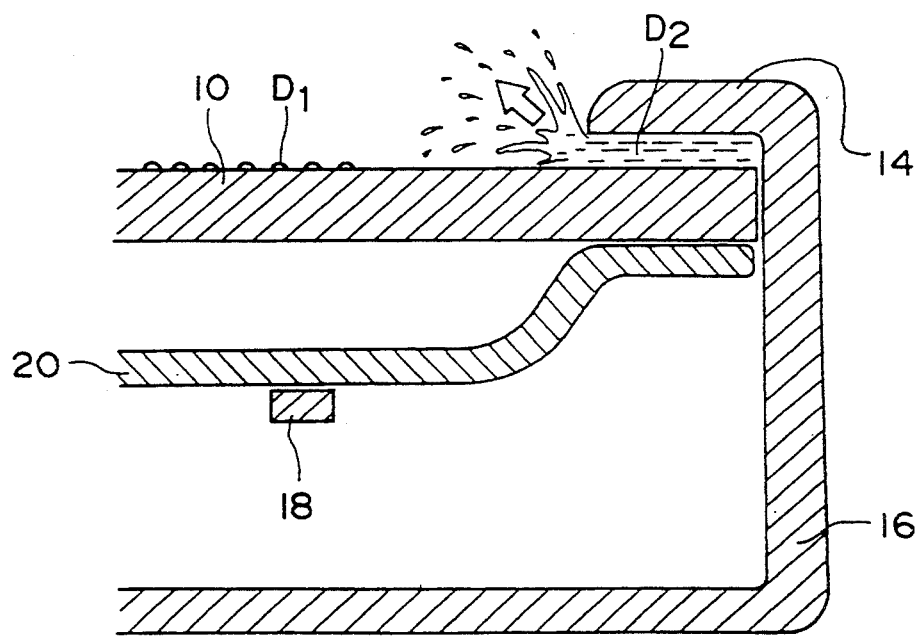
FIG. 2 is a section taken along a line II—II in FIG. 1.
Figure 3:
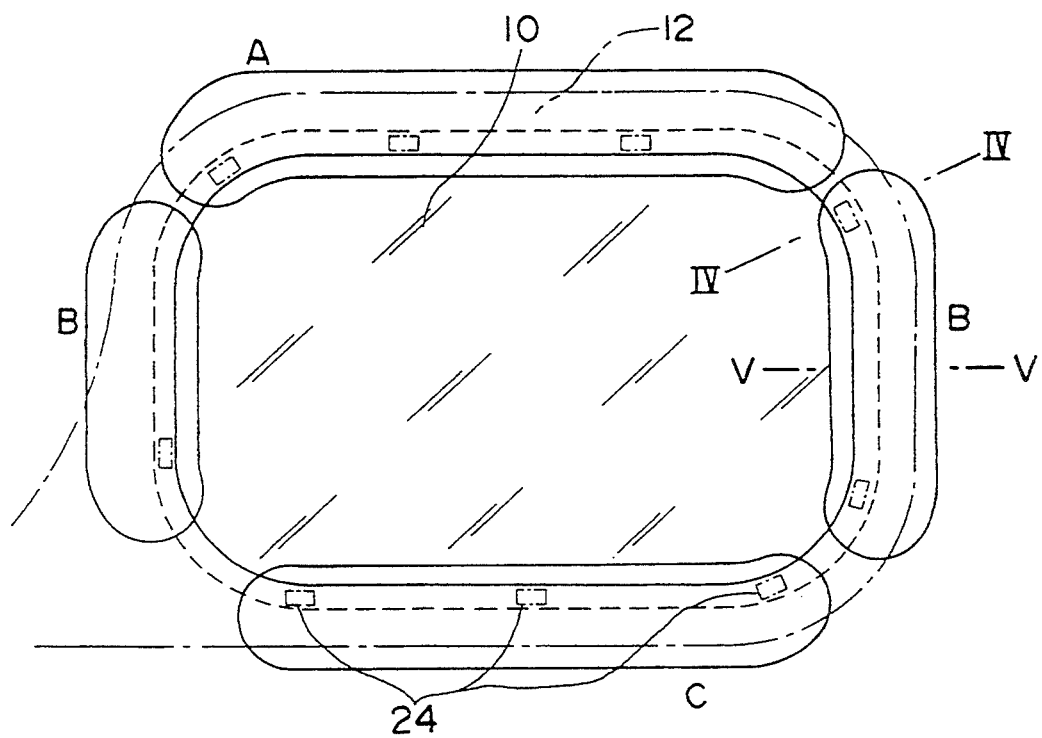
FIG. 3 is a front view of a mirror assembly, similarly to FIG. 1, according to an preferred embodiment of the present invention.
Figure 4:
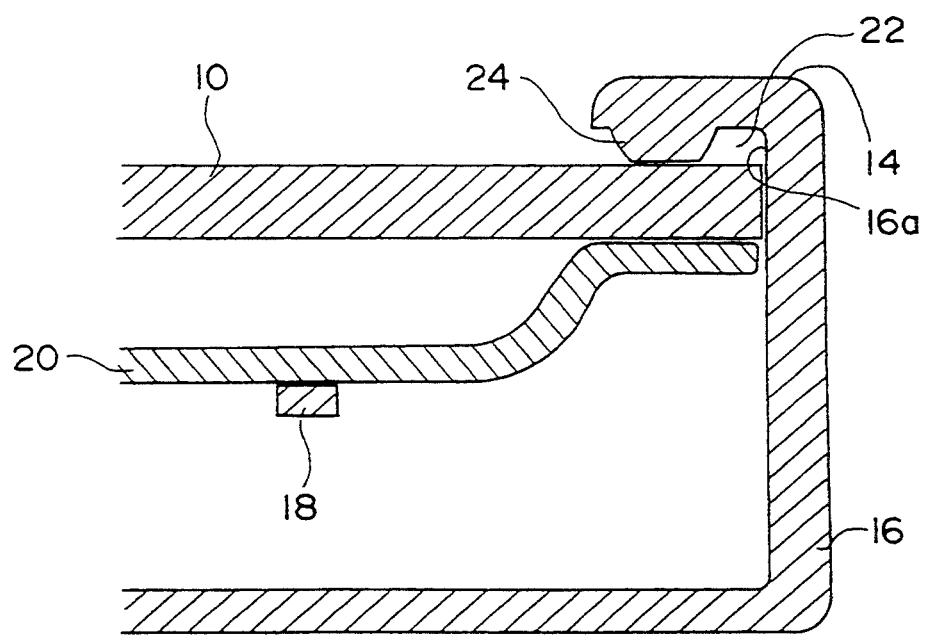
FIG. 4 is a section taken along a line IV—IV in FIG. 3.

Referring to FIGS. 3 and 4, similarly to the conventional mirror assembly as shown in FIGS. 1 and 2, the mirror assembly according to the present invention includes a mirror glass 10, a back holder 16 for holding the mirror glass 10, and a supersonic generator located between the glass plate 10 and the back holder 16. The supersonic generator comprises a vibration element 18 and a vibration plate 20. The back holder 16 is provided with a periphery flange 14 engaging the front surface of the edge of the mirror glass 10.

It is noted that the flange 14 is provided with a plurality of projections 24 which are spaced from each other and extend inwardly from the inner surface of the flange 14 to contact the front surface of the edge of the mirror glass 10, respectively. When the vibration element 18 is vibrated, its vibration is transmitted to the mirror glass 10 via the vibration plate 20, causing the vibration of the mirror glass 10 to splash the water drops on the mirror glass 10.

Figure 5:
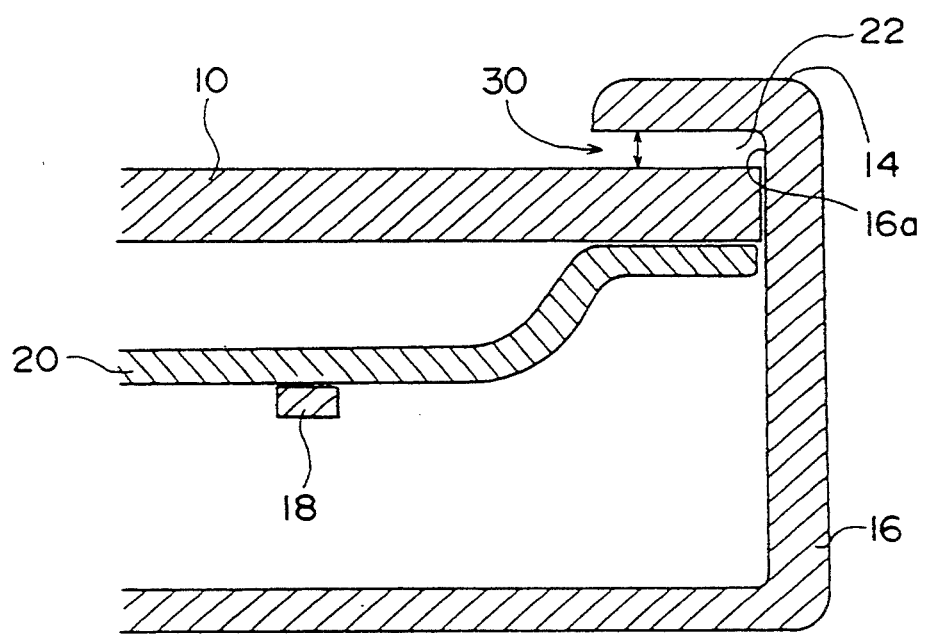
FIG. 5 is a section taken along a line V—V in FIG. 3.

A predetermined gap 30 as seen in FIG. 5 is between the inner surface of the flange 14 and the mirror glass 10. The gap is significantly important in order to prevent both pumping action and cavitation as described above. Namely, if the gap is too small, the pumping action will be generated, while if the gap is too broad, the cavitation will appear. In order to prevent both pumping action and cavitation, the dimensions of the gap must be set at an appropriate value. The inventors found a fact such that the dimensions of the gap has a close relation with the input power supplied to the vibration element 18 and the vibration frequency of the element 18. For instance, if the input power of the vibration element 18 is 30 W and the vibration frequency is 35 KHz, the gap is preferably set at 0.2–0.8 mm, and 0.4 mm best, so that both pumping action and cavitation can be avoided.

As shown in FIG. 4, each projection 24 is located away from the inner face 16a of the side wall of the back holder 16, so that is defined a space 22 surrounded by the flange 14, side wall of the back holder 16, projection 24 and the mirror glass 10.

A part of the water drops invading into the gap at the upper zone A will drop downwardly along the surface of the mirror glass 10 as a result of gravity, and the dropping water drops on the glass surface is splashed by the vibration of the mirror glass 10.

The water drops invading into the gap at the side zones B will drop downwardly along the surface of the front surface of the edge the mirror glass 10 through the spaces 22.

Further, the water drops having dropped along the surface of the mirror glass 10 will reach the bottom zone C of the flange 16. A part of the collected water drops in the bottom zone C will overflow the gap at the bottom zone C, while the other part of the water drops will remain in the zone C.

It is noted that the present invention does not require a hydrophilic treatment on the front surface of the edge of the mirror glass at especially the zone C which was conventionally necessary to avoid the splash of the water drops due to the pumping action.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A vibrating mirror assembly for removing water drops comprising:

a mirror glass, a back holder for holding the mirror glass, having a flange with a plurality of projections which engage the front surface of the mirror glass, and a supersonic generator for causing a vibration of the mirror glass which is mounted in the back holder and behind the mirror glass, the plurality of projections are spaced from each other and extend from the inner surface of the flange to contact the front surface of the mirror glass so that a gap is defined between the inner surface of the flange and the front surface of the mirror glass and is set at a predetermined value such that a pumping action and cavitation of the water drops caught in the gap can be prevented.

2. The mirror assembly according to claim 1, wherein the gap is 0.2–0.8 mm.

3. The mirror assembly according to claim 1, wherein each of the projections is spaced from a inner side face of the back holder so as to define a space, each space being surrounded by a projection, the inner surface of the flange, the inner side face of the back holder and the front surface of the mirror glass, whereby the water drops caught in the gap can pass through the space.

4. The mirror assembly according to claim 3, wherein the gaps and spaces together form an annular shape around a periphery of the front surface of the mirror glass.

5. The mirror assembly according to claim 4, wherein the spaces are interrupted around the periphery of the front surface of the mirror glass.

6. The mirror assembly according to claim 1, wherein the gaps in part form an annular shape around a periphery of the front surface of the mirror glass.

7. A vibrating mirror assembly for removing water drops comprising:

a mirror glass, a back holder for holding the mirror glass, the back holder having a flange with a plurality of projections which contact a front surface of the mirror, the projections being spaced from each other, a supersonic generator for vibrating the mirror glass, the supersonic generator being mounted in the back holder behind the mirror glass, and means for preventing pumping action and cavitation of the water drops around a periphery of the front surface of the mirror glass, said means for preventing comprises at least one gap defined between an inner surface of the flange and the front surface of the mirror glass, the gap being set at a predetermined value.

8. The mirror assembly according to claim 7, wherein the gap is 0.2–0.8 mm.

9. The mirror assembly according to claim 7, wherein each projection is spaced from an inner side face of the back holder to define a space, each space being surrounded by a projection, the inner surface of the flange, the inner side face of the back holder and the front surface of the mirror glass, water drops caught in the at least one gap being movable through the space.

10. The mirror assembly according to claim 9, wherein the gaps and the spaces have an annular shape around a periphery of the front surface of the mirror glass.

11. The mirror assembly according to claim 10, wherein the spaces are interrupted around the periphery of the front surface of the mirror glass.

* * * * *